United States Patent

Yamana et al.

[11] Patent Number: 6,126,849
[45] Date of Patent: Oct. 3, 2000

[54] AQUEOUS DISPERSION-TYPE FLUORINATED WATER- AND OIL-REPELLENT

[75] Inventors: Masayuki Yamana; Norimasa Uesugi; Eiji Ogura, all of Osaka, Japan

[73] Assignee: Daikin Industries, Ltd., Osaka, Japan

[21] Appl. No.: 09/202,095

[22] PCT Filed: Jun. 4, 1997

[86] PCT No.: PCT/JP97/01894

§ 371 Date: Dec. 9, 1998

§ 102(e) Date: Dec. 9, 1998

[87] PCT Pub. No.: WO97/48780

PCT Pub. Date: Dec. 24, 1997

[30] Foreign Application Priority Data

Jun. 21, 1996 [JP] Japan ................................. 8-161942

[51] Int. Cl.$^7$ .............................. D06M 9/00; B05D 3/02
[52] U.S. Cl. ...................... 252/8.62; 252/8.61; 427/393.4
[58] Field of Search ................... 526/243–245; 524/520, 544, 805; 427/393.4; 252/8.62

[56] References Cited

U.S. PATENT DOCUMENTS

| | | | |
|---|---|---|---|
| 4,778,915 | 10/1988 | Lina et al. | 560/29 |
| 4,920,190 | 4/1990 | Lina et al. | 526/288 |
| 5,093,398 | 3/1992 | Rottger et al. | 524/322 |
| 5,350,795 | 9/1994 | Smith et al. | 524/507 |
| 5,439,998 | 8/1995 | Lina et al. | 526/243 |
| 5,466,770 | 11/1995 | Audenaert et al. | 528/60 |
| 5,614,123 | 3/1997 | Kubo et al. | 252/862 |
| 5,725,789 | 3/1998 | Huber et al. | 252/8.62 |
| 5,804,650 | 9/1998 | Tsudsa et al. | 524/805 |
| 5,817,419 | 10/1998 | Fryd et al. | 428/422 |
| 5,852,148 | 12/1998 | Behr et al. | 526/245 |
| 5,876,617 | 3/1999 | Sato et al. | 252/8.62 |
| 5,883,175 | 3/1999 | Kubo et al. | 524/458 |

FOREIGN PATENT DOCUMENTS

| | | |
|---|---|---|
| 0672691A1 | 9/1995 | European Pat. Off. . |
| 58-1232 B2 | 1/1983 | Japan . |
| 58-12637 2A | 7/1983 | Japan . |
| 61-26408 1A | 11/1986 | Japan . |
| 63-14027 | 3/1988 | Japan . |
| 3-24186 | 2/1991 | Japan . |
| 324368 5A | 10/1991 | Japan . |
| 4-164990 | 6/1992 | Japan . |
| 6017034 | 1/1994 | Japan . |
| 6-166705 | 6/1994 | Japan . |
| 7-17377 2A | 7/1995 | Japan . |

*Primary Examiner*—Yogendra Gupta
*Assistant Examiner*—Gregory E. Webb
*Attorney, Agent, or Firm*—Birch, Stewart, Kolasch & Birch, LLP

[57] ABSTRACT

An aqueous dispersion-type fluorine-containing water- and oil-repellent wherein (A) a fluorine-containing copolymer of (A-1) a monomer having a polyfluoroalkyl group and (A-2) a monomer copolymerizable therewith is dispersed in the presence of (B) a emulsifier containing a fluorine-containing cationic surfactant, is excellent in fastness to rubbing.

3 Claims, No Drawings

AQUEOUS DISPERSION-TYPE FLUORINATED WATER- AND OIL-REPELLENT

This application is the national phase under 35 U.S.C. §371 of prior PCT International Application No. PCT/JP97/01894 which has an International filing date of Jun. 4, 1997 which designated the United States of America.

1. Field of the Invention

The present invention relates to an aqueous dispersion-type fluorine-containing water- and oil-repellent having excellent fastness to rubbing.

2. Related Art

Heretofore, aqueous dispersion-type fluorine-containing water- and oil-repellents prepared by emulsion-polymerization of a perfluoroalkyl group-containing methacrylate or acrylate ester with a monomer copolymerizable therewith have been used to confer water- and oil-repellency on a textile. Usually, these water- and oil-repellents are produced by emulsion-polymerization in the presence of a hydrocarbon-based emulsifier. However, if a dyed fabric made of fibers is subjected to water- and oil-repellency treatment with a fluorine-containing compound, there is the disadvantage of reduction of dye fastness to rubbing.

In order to prevent deterioration of fastness, a composition comprising a fluorine-containing compound and a specific polysiloxane has been proposed (Japanese Patent Kokoku Publication No. 1232/1983). Further, a composition comprising a glycol and a fluorine-containing compound has also been proposed (Japanese Patent Kokai Publication No. 173772/1995). However, these compositions are not adequate in respect of fastness to rubbing. In particular, fabrics composed of micro-fibers referred to collectively as new synthetic fibers have not achieved satisfactory results under the present circumstances.

SUMMARY OF THE INVENTION

An object of the present invention is to provide an aqueous dispersion-type fluorine-containing water- and oil-repellent excellent in fastness to rubbing.

The present invention provides an aqueous dispersion-type fluorine-containing water- and oil-repellent wherein (A) a fluorine-containing copolymer comprising (A-1) a monomer having a polyfluoroalkyl group and (A-2) a monomer copolymerizable therewith is dispersed in the presence of (B) an emulsifier comprising a fluorine-containing cationic surfactant.

DETAILED DESCRIPTION OF THE INVENTION

Examples of the polyfluoroalkyl group-containing monomer (A-1) in the present invention include the following polyfluoroalkyl group-containing (meth)acrylates:

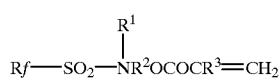

(1)

(2)

(3)

(4)

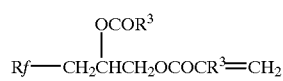

(5)

(6)

wherein $R_f$ is a $C_3$–$C_{21}$ polyfluoroalkyl group or polyfluoroalkenyl group, $R^1$ is hydrogen or a $C_1$–$C_{10}$ alkyl group, $R^2$ is a $C_1$–$C_{10}$ alkylene group, $R^3$ is hydrogen or a methyl group, Ar is an arylene group which may have a substituent group, and n is an integer of 1 to 10.

Specific examples are as follows:

$CF_3(CF_2)_7(CH_2)OCOCH=CH_2$,
$CF_3(CF_2)_6(CH_2)OCOC(CH_3)=CH_2$,
$(CF_3)_2CF(CF_2)_6(CH_2)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_6CH_2CH(OCOCH_3)CH_2OCOC(CH_3)=CH_2$,
$(CF_3)_2CF(CF_2)_8CH_2CH(OH)CH_2OCOCH=CH_2$,
$CF_3C_6F_{10}(CF_2)_2SO_2N(CH_3)(CH_2)_2OCOCH=CH_2$,

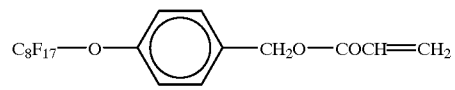

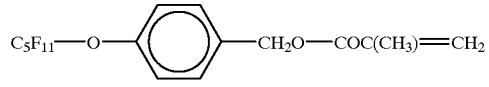

As a matter of course, the polyfluoroalkyl group-containing monomer (A-1) may be used as a mixture of at least two.

The other monomer (A-2) copolymerizable with the polyfluoroalkyl group-containing monomer (A-1) includes, but is not limited to, known compounds having a polymerizable unsaturated linkage. The monomer (A-2) may be a monomer containing no fluorine atom. Specific examples of the other monomer (A-2) copolymerized include (meth)acrylates such as 2-ethylhexyl (meth)acrylate, cyclohexyl (meth)acrylate, stearyl (meth)acrylate, hydroxyalkyl (meth)acrylate, polyoxyalkylene (meth)acrylate, 3-chloro-2-hydroxypropyl (meth)acrylate, glycidyl (meth)acrylate, N,N-dimethylaminoethyl (meth)acrylate and N,N-diethylaminoethyl (meth)acrylate. Further, mention is made of ethylene, butadiene, vinyl acetate, chloroprene, vinyl halides such as vinyl chloride and vinyl fluoride, halogenated vinylidene, styrene, acrylonitrile, (meth)acrylamide, vinyl alkyl ether, diacetone(meth)acrylamide, N-methylol (meth)acrylamide, vinyl alkyl ketone, maleic anhydride, N-vinylcarbazole and (meth)acrylic acid. The other monomer (A-2) can be used alone or in combination of at least two of the above compounds.

Among them, vinyl chloride or stearyl acrylate are preferable in view of water- and oil-repellency, stain resistance, washing durability and dry cleaning durability for water- and oil-repellency and stain resistance, and feeling. A weight ratio of the polyfluoroalkyl group-containing monomer (A-1) to the other monomer (A-2) may be from 30:70 to 90:10, more preferably from 50:50 to 80:20. A molecular weight of the copolymer may be from 500 to 1,000,000.

The fluorine-containing cationic surfactant in the emulsifier (B) has lower affinity for dyestuffs than usual hydrocarbon-based surfactants, and the dyed fabric treated with the water- and oil-repellent comprising the fluorine-containing cationic surfactant does not cause dyestuffs to be raised on the surface and is thus excellent in fastness to rubbing.

The fluorine-containing cationic surfactant includes, but is not limited to, a compound of the following formula:

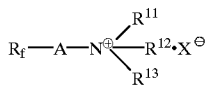

wherein $R_f$ is a $C_3$–$C_{21}$ polyfluoroalkyl group or polyfluoroalkenyl group, A is a $C_1$–$C_{10}$ alkylene group, —CH$_2$CH(OH)—CH$_2$—, —CON(R')—Q— or —SO$_2$N(R')—Q— wherein R' represents a hydrogen atom or a lower alkyl group, and Q represents a divalent organic group;

each of $R^{11}$ and $R^{12}$ is a $C_1$–$C_{10}$ alkyl group or hydroxyalkyl group;

$R^{13}$ is a $C_1$–$C_{10}$ alkyl group or aryl group; and

X is halogen.

Specific examples of $R^{11}$ and $R^{12}$ are CH$_3$—, C$_2$H$_5$—, C$_4$H$_9$— and —CH$_2$—CH$_2$—OH. Specific examples of $R^{13}$ are CH$_3$—, C$_2$H$_5$— and Ph—CH$_2$— (Ph is a phenyl group). Specific examples of X are Cl, Br and I.

Specific examples of the fluorine-containing cationic surfactant are as follows:

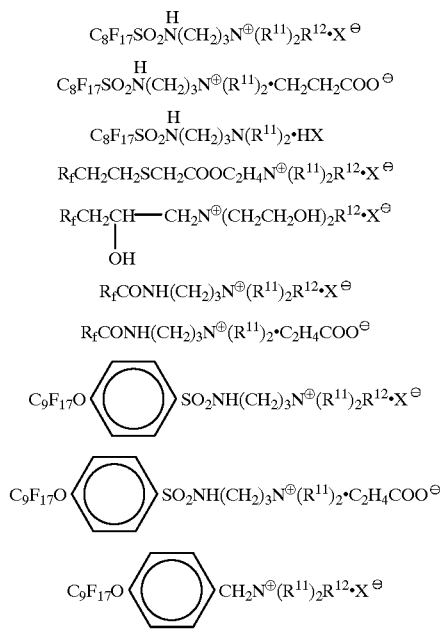

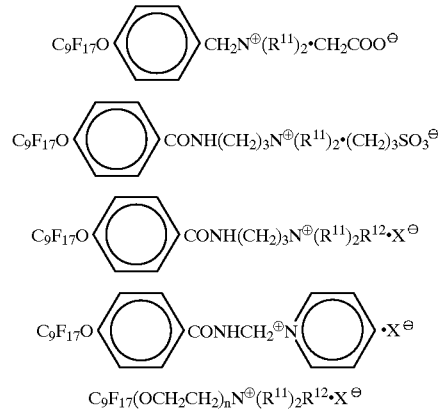

Particularly the following compounds are preferable in view of fastness to rubbing:

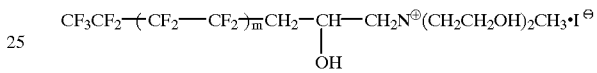

(m=2 to 6).

A process for producing the copolymer (A) in the aqueous dispersion-type fluorine water-repellent and oil-repellent of the present invention is preferably an emulsion polymerization. For the emulsion polymerization, a conventional method can be used. By way of example, the monomers (A-1) and (A-2) are emulsified in an aqueous medium in the presence of an emulsifier and polymerized by adding a polymerization initiator to the emulsion. For the purpose of facilitating the emulsification, the aqueous medium may contain a co-solvent, for example, ketones such as acetone and methyl ethyl ketone; esters such as ethyl acetate; glycols such as dipropylene glycol and ethylene glycol; and alkyl ethers of glycol such as dipropylene glycol monomethyl ether and diethylene glycol dimethyl ether. An amount of the co-solvent is preferably from 10 to 40 parts by weight based on 100 parts by weight of total of the monomers to be emulsified. The emulsifier contains the fluorine-containing cationic surfactant as the essential ingredient for emulsification.

In the present invention, the emulsifier (B) may consist of the fluorine-containing cationic surfactant but may contain other emulsifier (e.g. a fluorine-free surfactant, a fluorine-containing nonionic surfactant and a fluorine-containing anionic surfactant) than the fluorine-containing cationic surfactant. Although the emulsifier used in combination is not particularly limited, a nonionic or cationic fluorine-free surfactant is preferably used. For use in combination, the amount of the fluorine-containing cationic surfactant is at least 15 parts, preferably at least 30 parts by weight, based on 100 parts by weight of the emulsifier (B). Preferably, the amount of the emulsifier (B) is from 0.5 to 15 parts by weight based on 100 parts by weight of the whole monomers.

For the purpose of regulating the molecular weight of the polymer, a conventional chain transfer agent such as mercaptan can be used for the polymerization. The process for producing the copolymer comprising the monomer (A-1) having a polyfluoroalkyl group and the monomer (A-2) copolymerizable therewith in the aqueous dispersion-type fluorine-containing water- and oil-repellent of the present invention is not particularly limited, but in consideration of convenience described above, the copolymer is preferably prepared by the above-described emulsification polymerization.

The polymer may be synthesized by a conventional solution polymerization, suspension polymerization or the like, and after isolation of the polymer, it can be formed into an aqueous dispersion by use of the emulsifier containing the fluorine-containing cationic surfactant as the essential component. Further, another water- and oil-repellent agent, a softening agent, an antistatic agent, a cross-linking agent and an anticrease agent may be contained in the aqueous dispersion-type water- and oil-repellent of the present invention.

A substrate treated with the aqueous dispersion-type water- and oil-repellent of the present invention is not limited insofar as it is a textile, and a wide variety of examples can be mentioned. For example, mention can be made of animal and vegetable-originated natural fibers such as cotton, hemp, wool and silk; synthetic fibers such as polyamide, polyester, polyvinyl alcohol, polyacrylonitrile, polyvinyl chloride and polypropylene; and semi-synthetic fibers such as rayon and acetate; as well as fiber blends thereof. The aqueous dispersion-type water- and oil-repellent of the present invention can adhere to the surface of the substrate to be treated by e.g. conventional immersion coating, and then be dried. If necessary, the repellent may be applied together with a suitable cross-linking agent so that the repellent is cured.

PREFERRED EMBODIMENTS OF THE INVENTION

Hereinafter, the present invention is illustrated with reference to Examples, which however are not intended to limit the present invention.

Water repellency is expressed in terms of water repellency No. (see Table 1 below) by a spray method in accordance with JIS (Japanese Industrial Standard) L-1092. As to oil repellency, a few drops of a test solution shown in Table 2 were dropped on two positions on a test cloth, and 30 seconds later, the penetration state was observed to evaluate oil repellency according to AATCC-TM118. Fastness to rubbing was evaluated in a gray scale for pollution (6 levels from Grade 0 to Grade 5) (see Table 3) in a vibration crockmeter using a white cotton cloth as abrasion cloth after the cloth was rubbed back and forth 200 times at a load of 500 g.

TABLE 1

| Water repellency No. | States |
| --- | --- |
| 100 | No wet on the surface |
| 90 | Slight wet on the surface |
| 80 | Partial wet on the surface |
| 70 | Wet on the surface |
| 50 | Wet on the whole surface |
| 0 | Complete wet on the front and back surfaces |

TABLE 2

| Oil repellency No. | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |

TABLE 2-continued

| Oil repellency No. | Test solution | Surface tension (dyne/cm, 25° C.) |
| --- | --- | --- |
| 2 | Mixture of n-hexadecane/Nujol (35/65) | 29.6 |
| 1 | Nujol | 31.2 |
| 0 | Inferior to 1 | — |

TABLE 3

| Evaluation of dye fastness to rubbing | |
| --- | --- |
| Grade 5: | not colored |
| Grade 4: | colored slightly |
| Grade 3: | colored |
| Grade 2: | colored considerably |
| Grade 1: | colored intensely |
| Grade 0: | colored very intensely |

EXAMPLE 1

A 1 L glass autoclave equipped with a thermometer and a stirrer was charged with $CF_3CF_2(CF_2CF_2)_n CH_2CH_2OCOCH=CH_2$ (a mixture of compounds having n of 3, 4, 5 and 6 in a weight ratio of 61:28:9:2) (FA) (65 g), stearyl acrylate (StA) (18 g), N-methylolacrylamide (N-MAM) (2 g), a surfactant:

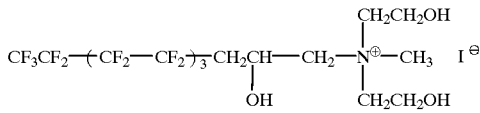

(referred to as fluorine-containing cationic surfactant A) (5 g), polyoxyethylene nonyl phenyl ether (5 g), dipropylene glycol monomethyl ether (DPM) (20 g), lauryl mercaptan (0.1 g), and deionized water (188 g). The mixture was emulsified with a high-pressure homogenizer at a temperature of 60° C. under a pressure of 400 kg/cm² to give a milky-white emulsion. 15 g of vinyl chloride (VC) from a bomb was added thereto, and the atmosphere was replaced by nitrogen for about 60 minutes. Then, polymerization was initiated by addition of 2,2'-azobis(2-methylpropionamidine)dihydrochloride (V-50 manufactured by Wako Pure Chemical Industries, Ltd.) (0.5 g). After the polymerization at 60° C. for 16 hours, the reaction mixture was cooled at 40° C. or less to give an emulsion having a solid content of about 33%. The degree of conversion (that is, degree of polymerization) of FA determined by gas chromatography was 99.7%, and the degree of conversion (that is, degree of polymerization) of the whole monomers was 95%.

EXAMPLE 2

A 1 L three-necked flask equipped with a thermometer, a stirrer and a nitrogen inlet was charged with FA (65 g), StA (25 g), 2-ethyhexylmethacrylate (2EHMA) (8 g), N-MAM (2 g), a surfactant:

(referred to as fluorine-containing cationic surfactant B) (7 g), acetone (20 g), lauryl mercaptan (0.1 g), and deionized water (188 g). The mixture was emulsified with a high-pressure homogenizer at a temperature of 60° C. under a pressure of 400 kg/cm² to give a milky-white emulsion. After the atmosphere was replaced by nitrogen for about 60 minutes, polymerization was initiated by addition of 2,2'-azobis(2-methylpropionamidine)dihydrochloride (V-50 manufactured by Wako Pure Chemical Industries, Ltd.) (0.5 g). After the polymerization at 60° C. for 13 hours, the reaction mixture was cooled at 40° C. or less to give an emulsion having a solid content of about 33%. The degree of conversion of FA determined by gas chromatography was 99%, and the degree of conversion of the whole monomers was 97%.

EXAMPLES 3 To 7

Emulsion polymerization was conducted in the same manner as in Example 1 or 2 using a charge composition shown in Table I, and as a result, an emulsion having a solid content of 33% was obtained. The degrees of conversion of FA and the whole monomers as determined by gas chromatography are shown in Table I.

COMPARATIVE EXAMPLES 1 To 3

Emulsion polymerization was conducted in the same manner as in Example 1 or 2 using a charge composition shown in Table I, and as a result, an emulsion having a solid content of about 33% was obtained. The degrees of conversion of FA and the whole monomers as determined by gas chromatography are shown in Table I.

TABLE I

| Amount (part by weight) | Example 1 | Example 2 | Example 3 | Example 4 | Example 5 |
|---|---|---|---|---|---|
| FA | 65 | 65 | 65 | 65 | 65 |
| StA | 18 | 25 | 18 | 18 | 18 |
| 2EHMA | 0 | 8 | 0 | 0 | 0 |
| N-MAM | 2 | 2 | 2 | 2 | 2 |
| VC | 15 | 0 | 15 | 15 | 15 |
| DPM | 20 | 0 | 20 | 20 | 0 |
| Acetone | 0 | 20 | 0 | 0 | 20 |
| V-50 | 0.1 | 0.1 | 0.1 | 0.1 | 0.1 |
| Lauryl mercaptan | 0.5 | 0.5 | 0.5 | 0.5 | 0.5 |
| Fluorine-containing cationic surfactant A | 5 | 0 | 0 | 0 | 0 |
| Fluorine-containing cationic surfactant B | 0 | 7 | 0 | 0 | 5 |
| Fluorine-containing cationic surfactant C | 0 | 0 | 7 | 0 | 0 |
| Fluorine-containing cationic surfactant D | 0 | 0 | 0 | 7 | 0 |
| Octadecyl trimethyl ammonium chloride | 0 | 0 | 0 | 0 | 0 |
| Dioctadecyl dimethyl ammonium chloride | 0 | 0 | 0 | 0 | 0 |
| Dipolyoxyethylene alkyl benzyl ammonium | 0 | 0 | 0 | 0 | 0 |
| Polyoxyethylene nonyl phenyl ether | 5 | 0 | 0 | 0 | 0 |
| Polyoxyethylene monostearate | 0 | 0 | 0 | 0 | 0 |
| Polyoxyethylene sorbitan monopalmitate | 0 | 0 | 0 | 0 | 0 |
| Polyoxyethylene stearyl ether | 0 | 0 | 0 | 0 | 2 |
| Deionized water | 188 | 188 | 188 | 188 | 188 |
| Degree of conversion of FA (%) | 99.7 | 99 | 99 | 99.2 | 98 |
| Degree of conversion of the whole monomers (%) | 95 | 97 | 97 | 96 | 96 |

| Amount (part by weight) | Example 6 | Example 7 | Comparative Example 1 | Comparative Example 2 | Comparative Example 3 |
|---|---|---|---|---|---|
| FA | 65 | 65 | 65 | 65 | 65 |
| StA | 25 | 18 | 18 | 18 | 18 |
| 2EHMA | 8 | 0 | 0 | 0 | 0 |
| N-MAM | 2 | 2 | 2 | 2 | 2 |
| VC | 0 | 15 | 15 | 15 | 15 |
| DPM | 20 | 20 | 20 | 20 | 20 |
| Acetone | 0 | 0 | 0 | 0 | 0 |
| V-50 | 0.1 | 0.1 | 0.1 | 0.1 | 0.1 |
| Lauryl mercaptan | 0.5 | 0.5 | 0.5 | 0.5 | 0.5 |
| Fluorine-containing cationic surfactant A | 3 | 3 | 0 | 0 | 0 |
| Fluorine-containing cationic surfactant B | 4 | 0 | 0 | 0 | 0 |
| Fluorine-containing cationic surfactant C | 0 | 3 | 0 | 0 | 0 |
| Fluorine-containing cationic surfactant D | 0 | 0 | 0 | 0 | 0 |
| Octadecyl trimethyl ammonium chloride | 0 | 0 | 5 | 0 | 0 |
| Dioctadecyl dimethyl ammonium chioride | 0 | 0 | 0 | 5 | 0 |
| Dipolyoxyethylene alkyl benzyl ammonium | 0 | 0 | 0 | 0 | 5 |
| Polyoxyethylene nonyl phenyl ether | 0 | 1 | 5 | 5 | 0 |
| Polyoxyethylene monostearate | 0 | 0 | 0 | 0 | 2 |
| Polyoxyethylene sorbitan monopalmitate | 0 | 0 | 0 | 0 | 2 |
| Polyoxyethylene stearyl ether | 0 | 0 | 0 | 0 | 1 |
| Deionized water | 188 | 188 | 188 | 188 | 188 |
| Degree of conversion of FA (%) | 99 | 99 | 99 | 99 | 99 |

TABLE I-continued

| | | | | | |
|---|---|---|---|---|---|
| Degree of conversion of the whole monomers (%) | 97 | 97 | 97 | 96 | 96 |

Note
FA: $CF_3CF_2(CF_2CF_2)_nCH_2CH_2OCOCH=CH_2$
(a mixture of compounds having n of 3, 4, 5 and 6 in a weight ratio of 61:28:9:2)
StA: stearyl acrylate
2EHMA: 2-ethylhexyl methacrylate
N-MAM: N-methylol acrylamide
VC: vinyl chloride
DPM: dipropylene glycol methyl ether
V-50: 2,2'-azobis(2-methylpropionamidine)dihydrochloride (manufactured by Wako Pure Chemical Industries, Ltd.)

Pure Chemical Industries, Ltd.)

Fluorine-containing cationic surfactant A:

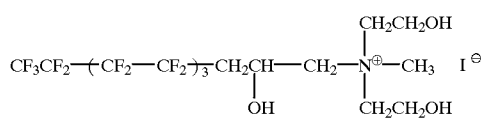

Fluorine-containing cationic surfactant B:

Fluorine-containing cationic surfactant C:

Fluorine-containing cationic surfactant D:

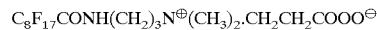

The solid content of each of the emulsions obtained in the Examples and Comparative Examples was adjusted to 20% with water and further adjusted to 1% with water to give a treatment liquid. A polyester macro-fiber fabric was immersed in this treatment liquid, and then squeezed with a mangle such that the wet pickup of the fabric was about 65%. Subsequently, the treated fabric was dried at 100° C. for 2 minutes and further heat-treated at 130° C. for 3 minutes. The resulting test fabric was evaluated for water repellency, oil repellency, and fastness to rubbing. The results are shown in Table

TABLE II

| | Water repellency | Oil repellency | Fastness to rubbing |
|---|---|---|---|
| Example 1 | 100 | 6 | 4–5 |
| Example 2 | 100 | 6 | 5 |
| Example 3 | 100 | 7 | 4 |
| Example 4 | 100 | 7 | 4 |
| Example 5 | 100 | 6 | 4–5 |
| Example 6 | 100 | 6 | 5 |
| Example 7 | 100 | 6 | 4 |
| Comparative Example 1 | 100 | 5 | 2 |
| Comparative Example 2 | 100 | 6 | 2 |

TABLE II-continued

| | Water repellency | Oil repellency | Fastness to rubbing |
|---|---|---|---|
| Comparative Example 3 | 100 | 5 | 2 |

What is claimed is:

1. An aqueous fluorine-containing water- and oil-repellent dispersion comprises (A) a fluorine-containing copolymer comprising (A-1) a monomer having a polyfluoroalkyl group and (A-2) a copolymerizable monomer which is vinyl chloride or stearyl acrylate which is dispersed in the presence of (B) an emulsifier comprising a fluorine-containing cationic surfactant, and (C) a co-solvent selected from the group consisting of ketones, esters, glycols and alkyl ethers of glycol.

2. The aqueous fluorine-containing water- and oil-repellent dispersion according to claim 1, wherein the fluorine-containing cationic surfactant is a compound represented by the formula:

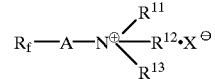

wherein $R_f$ is a $C_3$–$C_{21}$ polyfluoroalkyl group or polyfluoroalkenyl group, A is a $C_1$–$C_{10}$ alkylene group, —$CH_2CH(OH)$—$CH_2$—, —$CON(R')$—Q— or —$SO_2N(R')$—Q— wherein R' represents a hydrogen atom or a lower alkyl group, and Q represents a divalent organic group;
 each of $R^{11}$ and $R^{12}$ is a $C_1$–$C_{10}$ alkyl group or hydroxyalkyl group;
 $R^{13}$ is a $C_1$–$C_{10}$ alkyl group or aryl group; and
 X is halogen.

3. An aqueous fluorine-containing water- and oil-repellent dispersion comprises (A) a fluorine-containing copolymer comprises (A-1) a monomer having a polyfluoroalkyl group and (A-2) a copolymerizable monomer which is vinyl chloride or stearyl acrylate which is dispersed in the presence of (B) an emulsifier comprising a fluorine-containing cationic surfactant, and (C) a co-solvent selected from the group consisting of ketones, esters, glycols and alkyl ethers of glycol, and wherein dipropylene glycol monomethyl ether is used as a cosolvent.

* * * * *